United States Patent [19]

Leuba et al.

[11] Patent Number: 4,701,339
[45] Date of Patent: Oct. 20, 1987

[54] METHOD FOR DISSOLVING SQUID MEMBRANES

[75] Inventors: Jean-Louis Leuba, Boussens; Inge Meyer, La Tour-de-Peilz, both of Switzerland; Else M. Andersen, Bjuv, Sweden

[73] Assignee: Nestec S.A., Vevey, Switzerland

[21] Appl. No.: 832,125

[22] Filed: Feb. 20, 1986

[30] Foreign Application Priority Data

Mar. 4, 1985 [CH] Switzerland .......................... 962/85

[51] Int. Cl.⁴ ........................ A23L 1/333; A23L 1/325
[52] U.S. Cl. .................................... 426/643; 426/437; 426/479
[58] Field of Search .................... 426/643, 437, 479, 7

[56] References Cited

U.S. PATENT DOCUMENTS 3,034,906  5/1962  Williams .............................. 426/479
4,163,064  7/1979  Hill .................................. 426/643 X

FOREIGN PATENT DOCUMENTS 1074174  3/1980  Canada ................................ 426/643
1382290  1/1975  United Kingdom ................ 426/643

Primary Examiner—Raymond N. Jones
Assistant Examiner—Celine Callahan
Attorney, Agent, or Firm—Vogt & O'Donnell

[57] ABSTRACT

An extract of squid liver in a brine is prepared and the cleaned and eviscerated squid is immersed in the extract to dissolve the thin and resistant membrane situated between the flesh and the skin of the squid.

20 Claims, No Drawings

METHOD FOR DISSOLVING SQUID MEMBRANES

This invention relates to a process for dissolving membranes of squid.

In the field of utilization of products from the sea, numerous processes and machines have been developed for industrially performing the operations normally involved in the preparation of fish, molluscs or crustaceans. Many of these processes and machines have been specially developed for the preparation of specific species requiring well-defined operations.

So far as squids are concerned, there are particular cleaning and eviscerating machines and also enzymatic or chemical processes for separating certain undesirable membranes. This is because the tegument of certain squids, such as *Illex illecebrosus* and *Todarodes saqittatus*, fished in Norwegian waters, or *Ommastrephes solani*, fished in Japanese waters, has a highly resistant lower layer or membrane consisting of a very dense connective tissue. This membrane generally remains attached to the flesh when the squid has been skinned and contracts on cooking, deforms the pieces of cooked squid to which it is attached and offers unpleasant resistance to chewing.

A process was recently developed for separating this membrane from the flesh. This process comprises immersing the cleaned and eviscerated squid in a 5% NaCl brine and either heating the brine to 45° C. to activate the endogenous enzymes of the squid or cooling the brine to 3° C. and adding commercial proteases and glucosidases to attack the membranes so that they may be subsequently detached by vigorous rinsing with cold water. This process, although efficient, has several disadvantages, including excessive salting of the flesh, the need for vigorous rinsing and the difficulty of finding suitable commercially available enzymes. This is because commercial proteases, such as trypsin, ficin or papain, for example, are unable to degrade the native collagen of the membranes but, on the other hand, are capable of effectively attacking the flesh which can have adverse effects upon its keeping properties, its quality, its texture and its taste. In addition, commercial glucosidases and collagenases are relatively rare and expensive and, in origin, are occasionally incompatible with nutritional applications.

The object of the present invention is to provide a process for dissolving membranes of squid which is simple and effective and which avoids the disadvantages mentioned above.

To this end, the process according to the invention is characterized in that liver of squid is dispersed in a brine containing from 0.2 to 8% by weight of NaCl in a quantity of 1 part by weight of liver to 1-35 parts by weight of brine, a fatty phase and an aqueous phase or extract are separated from the dispersion, the extract is diluted with water in a quantity of 1 part by weight of extract to 1-15 parts by weight of water while adjusting the NaCl content to 0.2-2% by weight and the pH to 3.0-8.0 and the cleaned and eviscerated squid is immersed in the diluted extract for 30 minutes to 10 hours at 1 to 30° C. so that the membranes of the calamary dissolve spontaneously in water in which the squid is scalded or cooked.

It has been found that it is thus possible to accomplish the required objective by turning completely away from commercial enzymes and starting out solely from the basic material represented by the squid itself.

In the context of the invention, the term "membrane" is thus used to designate the particularly dense, resistant and tough, although thin, connective tissue which forms the lower layer of the tegument of squids, namely the layer directly and firmly attached to the flesh.

Similarly, the term "skin" is used to designate the relatively loose and thick connective tissue which forms the outer layer of the tegument of squids and which slides relatively easily on the lower layer or membrane of the tegument.

The adjectives "inner" and "outer" are used to qualify a noun relating to the hollow mantle of the squid, depending on whether the inside or outside of the mantle is in question. It is thus possible to distinguish between inner and outer membranes or skins of the mantle, the inner skin being colorless and the outer skin being provided with pigmented cells.

Unless otherwise indicated, the term "liver" is used globally to designate the liver optionally accompanied by all or part of the remains of the viscera of the squid.

Unless otherwise indicated, the expression "the cleaned and eviscerated squid" is used again globally to designate the edible parts of the squid, namely the mantle and/or the tentacles and/or the fins in whole or divided form. To obtain these parts, the fins will have been cut off, the head of the calamary removed, the tentacles detached from the head, the viscera removed and the pen withdrawn from the mantle during the mechanical and/or manual cleaning and eviscerating operations. The outer skin may also have been removed from the mantle.

Finally, the expression "the membranes dissolve spontaneously" is understood to mean that the membranes disintegrate and dissolve in about 1 to 5 minutes in water at approximately 50°-60° C.

To determine whether or not the membranes dissolve spontaneously in accordance with the present process, the squid is subjected to a dissolution test in which it is immersed in cold water and heated. The result of the test is considered positive when the membranes begin to disintegrate and dissolve at approximately 50° to 60° C. and when they are completely dissolved after the water has simmered for 3 minutes.

The process according to the invention may be applied to any species of squids which are distinguished by particularly tough membranes, more especially the small *Illex illecebrosus* or the relatively large *Todarodes sagittatus* and *Ommastrephes solani* which can grow to as large as 60 to 70 cm in only one or two years.

Fresh or defrozen squid may be used. Once the squid has been cleaned and eviscerated, the liver may be detached from the rest of the viscera comprising inter alia the pancreas, the stomach and the caecum. The liver may also be used with all or part of the remains of the viscera.

The liver is dispersed in the brine in a quantity of 1 part by weight of liver to 1-35 and preferably to 2-8 parts by weight of brine. To this end, the contents of the liver may be expressed into the brine and stirred gently or, alternatively, the liver and all or part of the remains of the viscera may be introduced into the brine and vigorously stirred or even briefly homogenized. In this connection, it is preferred to avoid excessively vigorous stirring or excessively long homogenization so as not to emulsify the dispersion which would complicate subsequent separation of the fatty and aqueous phases mentioned above.

The brine has a salt content of from 0.2 to 8%. Its pH-value does not have to be specially adjusted. However, if the salt is used in a concentration near the lower end of the above-mentioned range, the pH may be lowered slightly, for example, to approximately 4.5, and the ionic strength increased with a suitable buffer, such as, for example, a sodium citrate-phosphate buffer. So far as the upper end of the above-mentioned range is concerned, the concentration limit of 8% of NaCl should not be exceeded so as not unnecessarily to increase the salt content of the dilute extract in which the squid is to be immersed.

The above-mentioned fatty phase is then separated from the above-mentioned aqueous phase or extract of the dispersion, for example, by centrifuging or by decantation. In one preferred embodiment, separation is carried out by decantation during standing for at least 4 hours at 1° to 10° C., for example, overnight at 4° C. This is because it has been found that the fatty phase can separate slowly from and accumulate above the aqueous phase providing care has been taken to avoid emulsification of the dispersion by excessively vigorous stirring or by overlong homogenization. The aqueous phase, i.e., the extract itself, will keep for at least 3 days at 4° C. It may also be frozen or freeze-dried without losing its activity.

The extract is then diluted with water in a quantity of 1 part by weight of extract to 1-15 parts by weight of water while adjusting the NaCl content of the dilute extract to 0.2-2% by weight and preferably to 0.2-0.49% by weight and its pH-value to 3.0-8.0 and preferably to 4.5-7.0. In one variant, the pH of the dilute extract is adjusted in a first step to a value of from 3.0 to 6.0 and, in a second step, to a value of from 6.0 to 8.0.

So far as the NaCl content of the dilute extract is concerned, it has been found that it is useful for facilitating and accelerating the work of the liver enzymes contained in the extract. However, it has been found that the NaCl content does not have to be any higher than 0.2-2% or even 0.2-0.49% to exert virtually its entire effect; and because it is not desirable for the NaCl content of the dilute extract to be too high, because otherwise the flesh of the squid would be impregnated with an excessive quantity of NaCl and would take on an excessively salty taste, it is of advantage to keep to the values indicated.

So far as the pH of the dilute extract is concerned, it has been found that the various liver enzymes contained in the extract work particularly satisfactorily in global terms if the pH is adjusted either in two steps or stages, namely in a first step to a slightly acidic pH of 3.0-6.0 and then, in a second step, to a neutral pH of 6.0-8.0 or vice versa, or in a single step to a neutral or even slightly acidic pH of from 4.5 to 7.0. These optional pH adjustments may be made with the usual reactants, such as for example NaOH or HCl. A suitable buffer, such as for example a sodium citrate-phosphate buffer, may also be used for acidification.

The cleaned and eviscerated squid is immersed in the dilute extract for 30 mins–10 hours at 1°–25° C. and preferably for 1–4 hours at 4°–12° C. in a quantity of 1 part by weight of squid to 0.5–3 parts by weight of dilute extract. The dilute extract may generally be recycled up to about five times.

It has been found that, in this way, the liver enzymes contained in the dilute extract attack the membranes of the squid in such a way that they are not actually detached from the flesh during the treatment itself or during subsequent rinsing, but instead dissolve spontaneously during the cooking or scalding process which has to be carried out in any case to make the squid edible. It may be pointed out at this juncture that the fact that the outer skin of the mantle of the squid may or may not have been removed during the cleaning and eviscerating operations is of no real significance because the connective tissue of the skin is sufficiently loose, particularly in a central zone adjoining the membrane, for the enzymes to diffuse readily to the membrane. If the outer skin of the mantle has not been removed beforehand, it may disintegrate and dissolve spontaneously at the same time as the membranes in the cooking or scalding water.

After the squid has been removed from the dilute extract and preferably rinsed to remove the dilute extract adhering to its surface, it may be marketed as such or deep-frozen either directly or after scalding for 2 to 3 minutes in boiling water, the time necessary for its membranes to disintegrate and dissolve completely in that water.

The process according to the invention is illustrated by the following Examples in which the parts and percentages quoted are by weight, unless otherwise indicated. The dissolution tests are carried out as described earlier on. The squids are of the species *Todarodes saqittatus*, are one or two years of age and are from about 60 to 90 cm in length including the tentacles.

EXAMPLE 1

A frozen squid stored at −40° C. is defrozen overnight at 4° C. The next day, it is cleaned and eviscerated without removing the outer skin of the mantle. Rectangular pieces 3–5 cm in size and 1–2 cm thick are cut from the mantle.

All the viscera are taken out and readily detached connective tissues are removed therefrom. By brief homogenization with a mixer, the viscera are dispersed in a 50 mmole/l sodium citrate-phosphate buffer containing 0.29% of NaCl and having a pH of 4.5 in a quantity of 126 g of viscera in 400 ml of buffer. The fatty and aqueous phases are separated by centrifuging for 60 mins at 6400 G. The supernatant phase, i.e., the aqueous phase or extract, is collected and kept in a cool place at 4° C.

Part of the extract is diluted in the same buffer containing 0.29% of NaCl and having a pH of 4.5 in a quantity of 20 ml of extract to 100 ml of buffer. In a first step, 5 of the above-mentioned pieces of calamary weighing a total of approximately 80 g are immersed in this 120 ml of dilute extract for 2 h at 25° C. The pieces are then rinsed with water.

A second part of the extract is diluted in a 50 mmole/l sodium phosphate buffer containing 0.29% of NaCl and having a pH of 7.0 in a quantity of 20 ml of extract to 100 ml of buffer. In a second step, the same 5 pieces of squid are immersed in this 120 ml of dilute extract for 2 h at 25° C. The pieces are then rinsed with water.

The dissolution test is carried out in the same way as described above, i.e., by immersing the 5 pieces in cold water while heating and allowing the water to simmer for 3 minutes. When the temperature of the water reaches 50°–60° C., the outer pigmented skin of the 5 pieces begins to disintegrate and to color the water by dissolving therein. At the same time, the membranes also begin to disintegrate and to dissolve. After the water has simmered for 3 minutes, the 5 pieces are flat and their surface has the homogeneous white color of the flesh, although dull. When they are cooked or fried for eating, they have a good texture which is both tender and crispy. More particularly, this texture is neither pasty, as it might have been if not only the membranes but also the flesh immediately beneath had been overly attacked during the treatment in two steps, nor rubbery as would be the case if the membranes had been inadequately attacked during the treatment in two steps.

If, for comparison, the dissolution test is carried out with untreated pieces of the above squid, it is found that they deform, i.e., curl around themselves as a result of the contraction of the membranes which are shiny in appearance and remain visibly attached to the flesh. When they are cooked or fried for eating, they offer an unpleasant resistance to chewing, i.e., have a rubbery texture due to the membranes which have remained attached to their surfaces.

EXAMPLE 2

The procedure is as described in Example 1, except that, in the second step, the 5 pieces are immersed in the same dilute extract as in the first step after its pH has been adjusted to 7.0 by the addition of NaOH. The dissolution test gives the same result as in Example 1.

EXAMPLE 3

The procedure is the same as in Example 1, except that, instead of using all the viscera, only the liver, the pancreas, the stomach and the caecum are used. The dissolution test gives the same result as in Example 1.

EXAMPLE 4

The procedure is as in Example 1, except that, instead of using all the viscera, only the liver is used in a quantity of 100 g of liver dispersed in 400 ml of buffer. The dissolution test gives the same result as in Example 1.

COMPARISON EXAMPLES (a) The procedure is as described in Example 1, except that, instead of using all the viscera, all the remains after removal of the liver are used. The membranes are barely attacked during the two-step treatment in the dilute extract. The dissolution test gives a very poor result. The pieces of squid behave hardly any better than untreated pieces.

(b) The procedure is as described in Example 1, except that, instead of using all the viscera, only the pancreas, the stomach and the caecum are used. The dissolution test gives the same negative result as in Comparison Example (a) above.

EXAMPLE 5

Rectangular pieces of squid 3–5 cm in size and 1–2 cm thick are prepared in the same way as described in Example 1.

The contents of the liver of the squid are expressed into a 50 mmole/l sodium citrate-phosphate buffer containing 0.29 % of NaCl and having a pH of 4.5 in a quantity of 100 g of liver to 400 ml of buffer. The whole is stirred gently over a long period to obtain a dispersion. The fatty and aqueous phases are separated by centrifuging for 60 minutes at 6400 G. The supernatant phase, i.e., the aqueous phase or extract, is collected.

The extract is diluted in the same buffer having a pH of 4.5 and containing 0.29% of NaCl in a quantity of 20 ml of extract to 100 ml of buffer. Five of the above pieces of squid weighing a total of approximately 80 g are immersed in this 120 ml of dilute extract for 2 h at 25° C. The pieces are then rinsed with water.

The dissolution test is carried out and gives a positive result for the 5 pieces.

EXAMPLE 6

The procedure is as described in Example 5, except that, instead of diluting the extract in a sodium citrate-phosphate buffer, it is diluted in a 50 mmole/l sodium phosphate buffer containing 0.29% of NaCl and having a pH of 7.0 in a quantity of 20 ml of extract to 100 ml of buffer. Five pieces of squid weighing a total of approximately 80 g are immersed in this 120 ml of dilute extract. The pieces are then rinsed with water.

The dissolution test is carried out and gives a positive result for the 5 pieces.

EXAMPLE 7

Fresh squids are cleaned and eviscerated. The livers are detached from the viscera. The contents of the livers are expressed into a 50 mmole/l sodium citrate-phosphate buffer containing 0.29% of NaCl and having a pH of 4.5 in a quantity of 1 part of liver to 5 parts of buffer. The whole is stirred gently to obtain a dispersion. The dispersion is left standing overnight at 4° C. to obtain separation of the fatty and aqueous phases, the fatty phase separating slowly from and accumulating above the aqueous phase. The fatty phase is removed and the aqueous phase or clear and light brown extract is collected.

The extract is diluted in water containing 0.3% of NaCl in a quantity of 1 part of extract to 5 parts of water and the pH of the dilute extract is adjusted to 6.0. The mantles of the squids are immersed in the dilute extract in a quantity of 1 part of mantles to 1.7 parts of dilute extract for a period of 2 hours at 10° C. with gentle stirring. The mantles are then rinsed with water.

The dissolution test is then carried out with the whole mantles. After the test, which gives a very positive result, the outer surface of the mantles is, in particular, a homogeneous and dull white in appearance.

EXAMPLE 8

Four fresh batches of squid mantles are successively immersed in the dilute extract of Example 7. With each batch, the dissolution test gives a result almost as good as that obtained in Example 1.

EXAMPLE 9

The procedure is as described in Example 7, except that, instead of immersing the squid mantles in the dilute extract at 10° C., they are immersed in the dilute extract at 4° C. The experiment is repeated at 22° C. with another batch of mantles. In both cases, the dissolution test gives a result almost as good as that obtained in Example 7.

EXAMPLE 10

Fresh squids are cleaned and eviscerated. The livers are detached from the viscera. The contents of the livers are expressed into a brine containing 6% of NaCl in a quantity of 1 part of liver to 5 parts of brine. The whole is stirred gently to obtain a dispersion. The dispersion is left standing for 4 h at 2° C. to obtain separation of the fatty and aqueous phases. The fatty phase is removed and the aqeuous phase or extract is collected.

The extract is diluted with water in a quantity of 1 part of extract to 5 parts of water so that the NaCl content of the dilute extract is 1%. The mantles of the squids are immersed in the dilute extract, which has a pH of 5.5–7.0, in a quantity of 1 part of mantles to 1.7 parts of dilute extract for 1–2 h at approximately 5° C. The mantles are then rinsed with water.

The dissolution test is carried out with the whole mantles. The test gives results as good as those obtained in Example 7.

EXAMPLE 11

Fresh squids are cleaned and eviscerated. The livers are detached from the viscera. The contents of the livers are expressed into a brine containing 1.5% of NaCl in a quantity of 1 part of liver to 5 parts of brine. The whole is stirred gently to obtain a dispersion. The dispersion is left standing for 4 h at 2° C. to obtain separation of the fatty and aqueous phases. The fatty phase is removed and the aqueous phase or extract is collected.

The extract is diluted with water in a quantity of 1 part of extract to 5 parts of water so that the NaCl content of the dilute extract is 0.25%. The mantles of the squids are immersed in the dilute extract, which has a pH of 5,5–7.0 in a quantity of 1 part of mantles to 1.7 parts of dilute extract for 1–2 h at approximately 5° C. The mantles are then rinsed with water.

The dissolution test is carried out with the whole mantles and gives good results. In particular, the outer surface of the mantles has a homogeneous, dull white color. Hardly any deformation of the mantle is observed and, in particular, none of the shrinkage typical of a mantle having intact membranes which contract during the test.

EXAMPLE 12

The procedure is as described in Example 1, except that the respective pH-values of the dilute extracts in the first and second steps are reversed. The dissolution test gives the same result as in Example 1.

We claim:

1. A process for treating edible parts of squid, so that squid membranes dissolve upon cooking in water, comprising preparing a dispersion of 1 part squid liver to from 1 to 35 parts of brine, which contains at least 0.2% by weight of NaCl, to obtain a fatty phase and an aqueous phase, separating the aqueous phase from the fatty phase, diluting the aqueous phase with 1 to 15 parts by weight of water per part by weight of the aqueous phase, adjusting the aqueous phase to obtain a NaCl content of at least 0.2% by weight and a pH between 3 and 8 and immersing the squid in t he adjusted aqueous phase for from 30 minutes to 10 hours at 1° C. to 30° C.

2. A process as claimed in claim 1 wherein the quantity of the squid liver dispersed in the brine is 1 part by weight of liver to from 2 to 8 parts of brine.

3. A process as claimed in claim 1 wherein the brine contains from 0.2% to 8% by weight of NaCl.

4. A process as claimed in claim 1 wherein diluted aqueous phase contains from 0.2% to 2% by weight NaCl.

5. A process as claimed in claim 1 wherein the NaCl content of the dilute aqueous phase is adjusted to from 0.2% to 0.49%.

6. A process as claimed in claim 1 wherein the pH of the dilute aqueous phase is adjusted to from 4.5 to 7.0.

7. A process as claimed in claim 1 wherein the pH of the dilute aqueous phase is adjusted in a first step to a value of from 3.0 to 6.0 and in a second step to a value of from 6.0 to 8.0.

8. A process as claimed in claim 1 wherein the pH of the dilute aqueous phase is adjusted in a first step to a value of from 6.0 to 8.0 and in a second step to a value of from 3.0 to 6.0.

9. A process as claimed in claim 1 wherein the squid is immersed in the dilute aqueous phase in an quantity of 1 part by weight of squid to from 0.5 to 3 parts by weight of the dilute aqueous phase.

10. A process as claimed in claim 1 wherein the squid is immersed in the dilute aqueous phase for from 1 to 4 hours at 4° C. to 12° C.

11. A process as claimed in claim 1 wherein the dispersion is prepared by expressing the contents of the liver into the brine and stirring.

12. A process as claimed in claim 1 wherein the dispersion is prepared by expressing the contents of the liver into the brine and homogenizing the liver and brine.

13. A process as claimed in claim 1 wherein the aqueous and fatty phases are separated by decantation after standing for at least 4 hours at from 1° C. to 10° C.

14. A process as claimed in claim 1 further comprising cooking the treated squid in boiling water.

15. A process as claimed in claim 1 further comprising treating the treated squid in water at a temperature of at least 50° C. for at least 1 minute.

16. A process as claimed in claim 15 wherein the treated squid is treated in the water for about from 1 to 5 minutes.

17. A process for treating edible parts of squid, so that squid membranes dissolve upon cooking in water, comprising preparing a dispersion of 1 part squid liver to from 1 to 35 parts of brine, which contains from 0.2% to 8% by weight of NaCl, to obtain a fatty phase and an aqueous phase, separating the aqueous phase from the fatty phase, diluting the aqueous phase with 1 to 15 parts by weight of water per part by weight of the aqueous phase, adjusting the aqueous phase to obtain a NaCl content of from 0.2% by weight and a pH between 3 and 8 and immersing the squid in the adjusted aqueous phase for from 30 minutes to 10 hours at 1° C. to 30° C.

18. A process as claimed in claim 17 wherein the aqueous and fatty phses are separated after standing for at least 4 hours at from 1° C. to 10° C. and wherein the squid is immersed in the dilute aqueous phase in a quantity of 1 part by weight of squid to from 0.5 to 3 parts by weight of the dilute aqueous phase.

19. A process claimed in claim 17 further comprising adding a buffer to the brine.

20. A process as claimed in claim 17 wherein the pH is adjusted to between 4.5 to 7.0.

* * * * *

UNITED STATES PATENT AND TRADEMARK OFFICE
CERTIFICATE OF CORRECTION

PATENT NO. : 4,701,339
DATED : October 20, 1987
INVENTOR(S) : Jean-Louis Leuba, et al.

It is certified that error appears in the above-identified patent and that said Letters Patent is hereby corrected as shown below:

Column 7, line 29, "5,5" should be --5.5--.

Claim 1, column 7, line 58, "t he" should be --the--.

Claim 4, column 8, line 1, after "wherein" insert --the--.

Claim 17, column 8, line 51, after "0.2%" insert --to 2%--.

Claim 18, column 8, line 56, "phses" should be --phases--.

Signed and Sealed this

Fifth Day of April, 1988

*Attest:*

DONALD J. QUIGG

*Attesting Officer*    *Commissioner of Patents and Trademarks*